(No Model.)
E. J. PENNINGTON.
MOTOR VEHICLE.
No. 570,440. Patented Oct. 27, 1896.
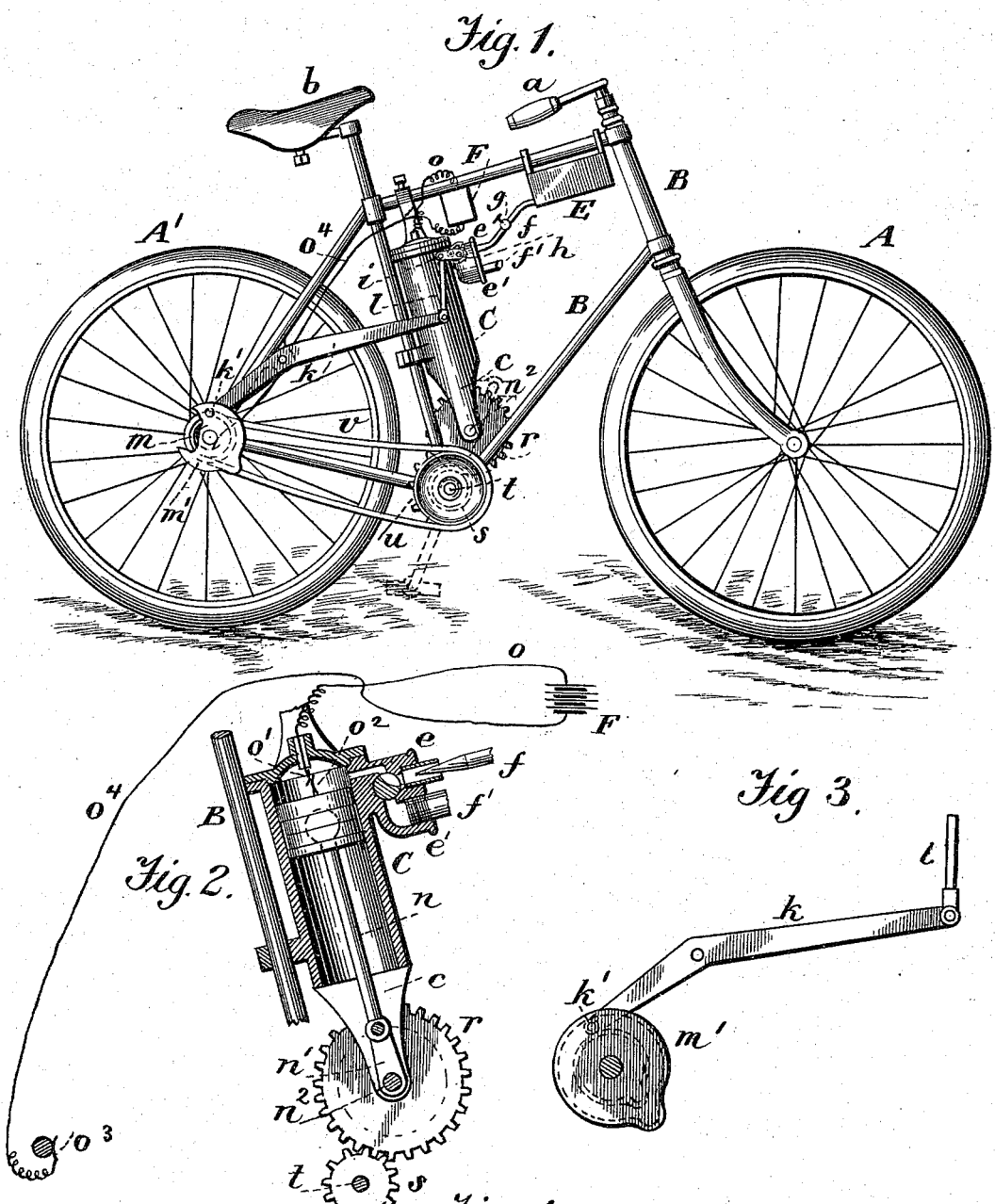
Witnesses:
A. Ruppert.
E. Cruse.
Inventor:
Edward J. Pennington,
by
Atty.

UNITED STATES PATENT OFFICE.

EDWARD J. PENNINGTON, OF CHICAGO HEIGHTS, ILLINOIS, ASSIGNOR TO THE MOTOR CYCLE COMPANY, OF CHICAGO, ILLINOIS.

MOTOR VEHICLE.

SPECIFICATION forming part of Letters Patent No. 570,440, dated October 27, 1896.

Application filed March 21, 1893. Serial No. 467,044. (No model.) Patented in England December 11, 1895, No. 23,771.

*To all whom it may concern:*

Be it known that I, EDWARD J. PENNINGTON, of Chicago Heights, in the county of Cook and State of Illinois, have invented certain new and useful Improvements in Wheeled Vehicles, of which the following is a specification, reference being had to the accompanying drawings and to the letters of reference marked thereon.

This invention is patented in England, in Patent No. 23,771, dated December 11, 1895.

The object of my invention is to furnish a light and convenient road vehicle driven by power obtained from a gasolene or other fluid engine.

In carrying out my invention I apply the engine to the vehicle, and provide a reservoir for the fluid of capacity sufficient for a run of several hours. The engine employed is of that class in which a charge of an explosive mixture of air and gasolene or the like is admitted behind the piston and is after compression exploded, so as to develop the necessary power.

The invention relates to the combination with a wheeled vehicle of an explosive engine of the compression type geared to one (or a pair) of the supporting-wheels and simplified by the omission of special mechanical instrumentalities for effecting the compression of the explosive mixture, the said mixture being compressed in the explosive cylinder through the momentum of the load (or rider) on the vehicle. The rider (or a suitable load) is therefore necessary to overcome the resistance of said mixture to compression and thus enable the vehicle to run. The construction also comprises certain particular features in the placing and support of the engine-cylinder, as hereinafter set forth.

In the accompanying drawings, Figure 1 is a side elevation of a road vehicle of the bicycle class, to which my invention is applied. Fig. 2 is a sectional view of the engine-cylinder, the electric connections being also shown; and Figs. 3 and 4 are details of the valve mechanism.

Similar letters of reference indicate similar parts in the respective figures.

A A' are the two wheels of the vehicle, which may be of the kind ordinarily used in the improved class of bicycles, tricycles, and similar vehicles having elastic tires, as shown, found necessary to give the wheels the required adhesion or tractive effect.

The frame proper of the vehicle is indicated, generally, by B.

The front wheel A is, as usual, employed for steering through the medium of the handles $a$, arranged to be under the control of the rider seated upon the saddle $b$. The cranks and pedals ordinarily used as parts of the propelling mechanism are omitted or not, as may be desired.

The cylinder of the engine is indicated by C, it being furnished with a rear head only, the front end of the cylinder being unclosed. The cylinder is preferably arranged as shown in the drawings, being secured to the rear standard and upper cross-piece of the frame of the vehicle by suitable clamping devices. The front end of the cylinder is provided with extensions $c$, which form the bearings for the shaft $n^2$ of the engine, the crank $n'$ of said shaft working between the extensions $c$. The union between the connecting-rod $n$ and the piston is made by means of a ball-and-socket joint, which allows of the necessary oscillation of said connecting-rod. On the shaft $n^2$ is mounted a main gear-wheel $r$, which engages with a small wheel or pinion $s$, placed upon the main driving-shaft $t$ of the vehicle, an ordinary sprocket-wheel $u$ being mounted upon said shaft, and being connected by means of the chain $v$ with the sprocket-wheel $m$ upon the axle of the rear wheel of the vehicle.

E represents the tank for holding the driving fluid, by preference gasolene, which is admitted to the branch $e$ through a pipe $f$, the admission being controlled by means of a valve $g$, and provision being made (as by one or more openings into the pipe $f$ between the valve $g$ and the branch $e$) for the admission of air to mix with the gasolene vapors and form the explosive charge. The branch $e'$ is that to which the exhaust-pipe $f'$ is attached. The admission of the explosive mixture to the rear end of the cylinder and the exhaust resulting from the explosion of the gases are controlled through the medium of a tapering valve-barrel $h$. The valve-barrel $h$ is operated through an arm $i$, attached to the long arm of a valve-lever or bell-crank $k$ by means of a link $l$, the short arm of said valve-lever or bell-crank being provided with a pin $k'$, which enters the groove of a valve-operating cam $m'$, mounted upon the axle of the rear wheel $A'$. In the revolution of said axle the necessary movements of the tapered valve-barrel $h$ are given to control the admission and exhaust of the explosive and exploded mixture.

An electric battery F is mounted upon the frame of the vehicle, and a wire $o$ passes from one pole thereof through the rear head of the cylinder C, the inner end of the wire being furnished with a contact-piece $o'$ for engaging a similar contact-piece $o^2$ on the outer end of the piston at the termination of its back stroke. The circuit is completed by means of a contact-piece $o^3$, bearing against the axle of the rear wheel $A'$, and a wire $o^4$, reaching from said contact-piece $o^2$ to the opposite pole of the battery F, the current passing through the metal of the cylinder, connecting-rod, &c. The arrangement is such that the charge of air and gasolene, or other fluid, is exploded by the separation of the contact-piece $o^2$ of the piston from that at the rear head of the cylinder. The parts being at the end of an instroke of the piston preparatory to an explosion, the valve $h$ closes the port $e^x$, by which both inlet and exhaust communicate with the interior of the cylinder. The explosive charge is supposed to have been compressed in the end of the cylinder during the previous instroke of the piston. As the piston moves outward the contacts $o'$ $o^2$ are separated, the spark passes, an explosion takes place, and the piston is forced out, turning the wheel and propelling the vehicle. During this outstroke of the piston the cam $m$ has made one revolution, (the gearing being made to give two revolutions of wheel $A'$ to each revolution of the crank-shaft, although this ratio may be varied,) and at each revolution has reciprocated the lever $k$ and advanced the valve $h$ a step; but the valve during the whole period remains closed, the movement taking place while the solid portion of said valve is opposite the port $e^x$, as will be readily understood.

As the piston finishes its outstroke and returns, the cam $m$ advances the valve $h$ again and opens the exhaust, which remains open during another revolution of the cam $m$ and advance of the valve $h$. The in-moving piston forces out the products of the explosion. When the piston again moves out, the cam $m$ advances the valve $h$ another step and opens the communication between the cylinder and pipe $f$, so that the out-moving piston sucks in the air and gasolene vapors. On the return instroke of the piston, the explosive mixture of air and gasolene is confined in the cylinder by the closing of the valve $h$, and although the vehicle alone would not effect the compression of this mixture, yet when loaded with a rider his momentum is transmitted to the piston and furnishes the power requisite to effect the compression. After compression, the ignition and explosion of the compressed charge and subsequent operations take place in order as already mentioned. This order of inspiration, compression, explosion, expansion, and exhaustion in two revolutions of the crank-shaft is common in explosive engines of the compression type. In order that the reciprocations of the lever $k$ may advance the valve $h$ step by step, the usual mechanical connection for that purpose (a pawl and ratchet) may be employed between the arm $i$ and the stem of valve $h$. It is considered unnecessary to illustrate it or the form of valve $h$, as it is within the competence of those skilled in the art to supply such details.

The particular valve mechanism employed is no part of the invention.

In an application of even date herewith, Serial No. 467,043, I have described a wheeled vehicle driven by the direct application of the power of an explosive engine to the driving-wheel without the intervention of gearing, and herein disclaim as a part of my present invention the construction therein described and claimed.

I make no claim in the present application to the engine itself, as a separate application will be filed therefor.

It is obvious that my invention is applicable to a vehicle of the tricycle or other class, as well as to one of the bicycle order.

Having described my invention, I claim—

1. In a wheeled vehicle, an explosive propelling-engine comprising a cylinder open at the lower end and closed at the upper end and provided at the lower end with extensions constituting bearings for the engine-shaft, said cylinder being secured to the vehicle-frame and the engine-shaft geared to a supporting-wheel of the vehicle, substantially as described.

2. In combination with a vehicle-frame having a vertical and upper and lower bars, an explosive-engine secured to said frame parallel with the vertical bar in the space between the upper and lower bars and having its shaft geared to a supporting-wheel of the vehicle, substantially as described.

EDWARD J. PENNINGTON.

Witnesses:
THEO. H. WIEDERHOLD,
R. HERRMANN.